United States Patent
Keil et al.

(10) Patent No.: US 10,910,912 B2
(45) Date of Patent: Feb. 2, 2021

(54) ELECTRIC MOTOR AND MOTOR SHAFT THEREOF

(71) Applicant: JOHNSON ELECTRIC INTERNATIONAL AG, Murten (CH)

(72) Inventors: Ronny Keil, Shenzhen (CN); Daisuke Tsunashima, Shenzhen (CN); Kwong Yip Poon, Hong Kong (CN); Yongqiang Song, Shenzhen (CN)

(73) Assignee: Johnson Electric International AG, Murten (CH)

( * ) Notice: Subject to any disclaimer, the term of this patent is extended or adjusted under 35 U.S.C. 154(b) by 232 days.

(21) Appl. No.: 15/826,927

(22) Filed: Nov. 30, 2017

(65) Prior Publication Data

US 2018/0175698 A1    Jun. 21, 2018

(30) Foreign Application Priority Data

Dec. 16, 2016  (CN) .......................... 2016 1 1170866

(51) Int. Cl.
*H02K 7/00* (2006.01)
*H02K 7/08* (2006.01)

(52) U.S. Cl.
CPC .............. *H02K 7/003* (2013.01); *H02K 7/08* (2013.01); *H02K 7/083* (2013.01)

(58) Field of Classification Search
None
See application file for complete search history.

(56) References Cited

U.S. PATENT DOCUMENTS

| | | | | |
|---|---|---|---|---|
| 8,436,497 B2 * | 5/2013 | Horng | ...................... | H02K 1/30 310/43 |
| 2007/0267818 A1 * | 11/2007 | Giard | ................... | F16J 15/3488 277/370 |
| 2013/0009504 A1 * | 1/2013 | Leroy | .................... | H02K 3/325 310/156.08 |
| 2015/0084461 A1 * | 3/2015 | Furukawa | .............. | H02K 5/161 310/90 |

FOREIGN PATENT DOCUMENTS

| | | | | |
|---|---|---|---|---|
| CN | 203835934 U | | 9/2014 | |
| CN | 104400099 A | * | 3/2015 | |
| CN | 205453336 U | | 8/2016 | |
| EP | 3104505 A1 | * | 12/2016 | ............. H02K 29/08 |

OTHER PUBLICATIONS

Machine translation of CN 104400099 A retrieved from Espacenet (Mar. 2015).*
Wikipedia Definition of Interference Fit, retrieved on Apr. 13, 2020, p. 1 first paragraph.*

* cited by examiner

*Primary Examiner* — Quyen P Leung
*Assistant Examiner* — Minki Chang
(74) *Attorney, Agent, or Firm* — Muncy, Geissler, Olds & Lowe, P.C.

(57) ABSTRACT

A motor shaft includes a main body and a chamfered end formed at an end of the main body. The chamfered end has a chamfer formed at a peripheral surface thereof, and a groove defined in an end surface thereof. An axial length of the chamfer is greater than a depth of the groove in the axial direction of the motor shaft. An electric motor including the motor shaft is also provided.

6 Claims, 6 Drawing Sheets

U.S. 10,910,912 B2

ELECTRIC MOTOR AND MOTOR SHAFT THEREOF

CROSS REFERENCE TO RELATED APPLICATIONS

This non-provisional patent application claims priority under 35 U.S.C. § 119(a) from Patent Application No. 201611170866.2 filed in The People's Republic of China on Dec. 16, 2016.

FIELD OF THE INVENTION

The present invention relates to the field of motors, and in particular to a motor shaft and an electric motor using the motor shaft.

BACKGROUND OF THE INVENTION

Electric motor that converts electric energy into mechanical energy, is used in every field of production and life of human. A motor shaft is one of the main parts of a motor. The output end of the motor shaft which extends to outside of the motor is used to connect with a load driven by the motor, such as a gear, a fan or a belt pulley. FIG. 1 is a perspective view of a traditional motor shaft. The motor shaft has opposite two ends, i.e., a threaded end 10 and a chamfered end 11. The chamfered end 11 includes a chamfer 111 and an elongated groove 112 defined in the end surface of the chamfer 111. The length of the chamfer 111 along the axial direction of the motor shaft is less than the depth of the groove 112 along the axial direction of the motor shaft. During assembly, the chamfered end 11 of the motor shaft needs to extend through a bearing so that the bearing is mounted around the motor shaft. The motor shaft is fixed in the inner race of the bearing by interference fit. During the chamfered end 11 of the motor shaft extending through the bearing, burrs existed at the edge of the groove 112 and non-circular cross section structure of the chamfered end 11 due to forming the groove 112 may probably scratch the inner race of the bearing and therefore generate noise, and may also produce scratches on the contact surface of the inner race of the bearing which affects the service life of the bearing.

SUMMARY OF THE INVENTION

Thus, there is a desire for an improved motor shaft which is capable of reducing abrasion of the bearing and noise generated in the assembling and using process and an electric motor using the improved motor shaft.

A motor shaft comprises a main body and a chamfered end formed at an end of the main body, the chamfered end comprising a chamfer formed at a peripheral side surface thereof and a groove defined in an end surface thereof. The axial length of the chamfer is greater than a depth of the groove in the axial direction of the motor shaft.

Preferably, the chamfer has an angle less than 45 degrees.

Preferably, the angle of the chamfer is in the range of 10° to 20°.

Preferably, the groove extends in a radial direction of the end surface of the motor shaft.

Preferably, two ends of the groove extend through opposite sides of the chamfered end.

Preferably, the motor shaft further comprises a threaded end formed at an opposite end of the main body, wherein diameters of the chamfered end and the threaded end are less than that of the main body.

Preferably, the maximum length of the groove is less than a diameter of the main body.

An electric motor comprises a stator and a rotor. The stator comprises an end cap and a housing. The rotor comprises a motor shaft described above. The chamfered end of the motor shaft is mounted to the end cap via a bearing.

Preferably, the bearing has an inner race in which the main body of the motor shaft is supported.

Preferably, the bearing has an inner race and a diameter of the inner race is greater than a diameter of any cross section of the chamfered end with the groove.

Preferably, the angle of the chamfer is in the range of 10° to 20°.

Preferably, the groove extends in a radial direction of the end surface of the motor shaft, and two ends of the groove extend through opposite sides of the chamfered end.

Preferably, the maximum length of the groove is less than a diameter of the main body.

In the present embodiments, the axial length of the chamfer is greater than the depth of the groove. When mounting a bearing around the motor shaft, the inner race of the bearing can effectively avoid burrs formed on edges of the groove of the motor shaft to thereby reduce abrasion of the inner race of the bearing and noise generated in the assembling process, prolong the usage life of the bearing, and smoothly mount the bearing to the motor shaft.

DETAILED DESCRIPTION OF THE PREFERRED EMBODIMENTS

Below, embodiments of the present invention will be described in greater detail with reference to the drawings. Apparently, the described embodiments are merely part of, rather than all of, the embodiments of the present invention. Based on the described embodiments of the present invention, any other embodiment obtained by a person skilled in the art without paying creative efforts shall also fall within the scope of the present invention.

Unless otherwise specified, all technical and scientific terms used in this disclosure have the ordinary meaning as commonly understood by people skilled in the art. The terms used in the specification of this disclosure are only for illustrating embodiments of the disclosure and do not limit the scope of the present disclosure.

Figure 1:
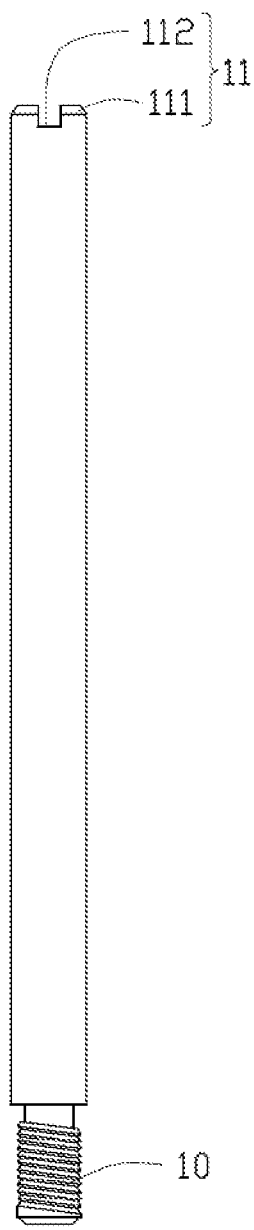
FIG. 1 is a perspective view of a traditional motor shaft.
Figure 2:
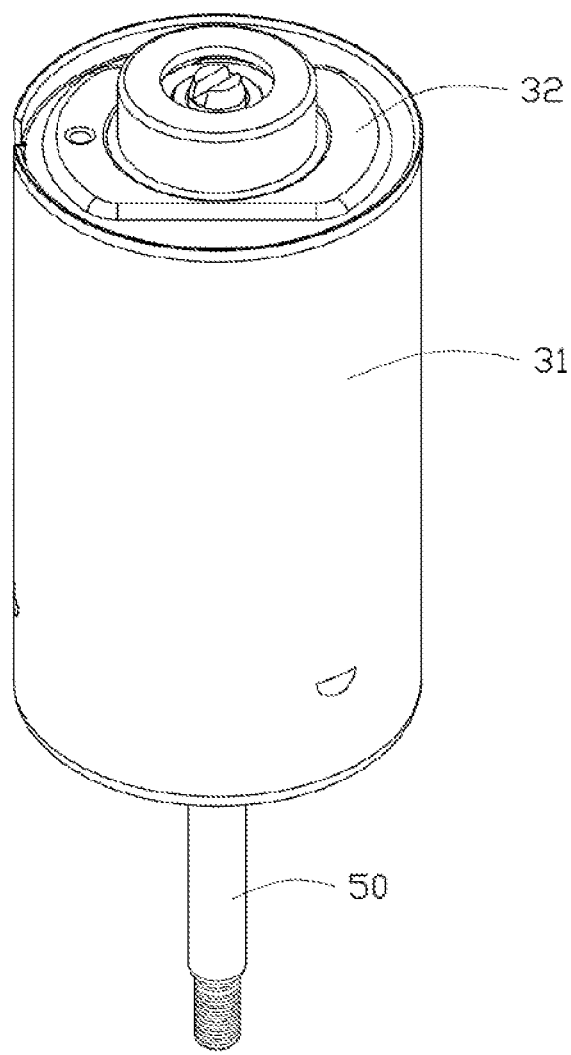
FIG. 2 is a perspective view of an electric motor according to an embodiment of the present disclosure.
Figure 3:
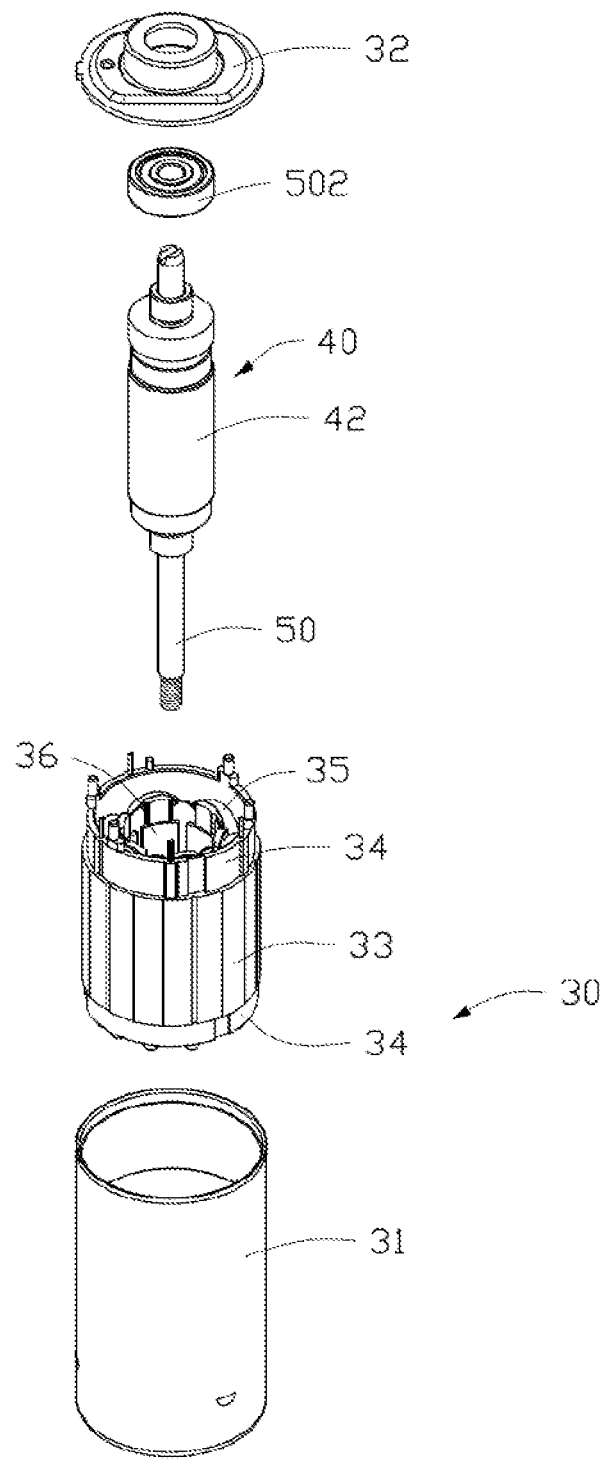
FIG. 3 is an exploded view of the electric motor of FIG. 2.

FIG. 2 is a perspective view of an electric motor according to an embodiment of the present disclosure. FIG. 3 is an exploded view of the electric motor of FIG. 2. Referring to FIGS. 2-3, the electric motor 20 includes a stator 30 and a rotor 40. The rotor 40 includes a motor shaft 50.

The stator 30 includes a tubular housing 31 with an open end, an end cap 32 mounted to the open end of the tubular housing 31, a stator core 33 mounted in the housing 31, an insulated frame 34 mounted to the stator core 33, and a stator winding 35 wound on the stator core 33 and supported by the insulated frame 34. The stator core 33 includes an outer yoke, a plurality of pole bodies extending inwardly from the yoke, and a plurality of pole shoes respectively extending from radially inner ends of the pole bodies in opposite circumferential directions. In this embodiment, the outer yoke has a continuous annular shape and is named as the outer annular portion of the stator 30. The pole shoes 36 cooperatively form a discontinuous annular shape which is named as the inner annular portion of the stator 30. The stator winding 35 is wound around the corresponding pole bodies, and the stator winding 35 is separated from the stator core 33 by the insulated frame 34. In the present embodiment, the stator winding 35 adopts a concentrated winding, i.e. each coil of the stator winding 35 only wounds around one pole body. Thus, the number of the pole bodies is equal to the number of the stator pole. Alternatively, each coil of the stator winding 35 may span a plurality of pole bodies which are called as a stator pole. Thus, the number of the pole bodies of the stator can be an integer multiple of the number of the stator pole, such as twice, three times, etc.

The stator core 33 is made of magnetic conductive material, for example, a plurality of magnetic laminations (silicon steel sheet commonly used in the art) stacked along the axial direction of the motor 20. Preferably, the pole bodies are distributed evenly along the circumferential direction of the motor 20. The radial inner end surfaces of the pole shoes 36 of the pole bodies are located at a circle which is concentric with the center of the rotor 40. It is understandable that the radial inner end surfaces of the pole shoes 36 may not at circles concentric with the center of the rotor.

The rotor 40 is accommodated in a space surrounded by the pole shoes 36 of the pole bodies, and an air gap is defined between the inner end surfaces of the pole shoes 36 and the rotor 40. The rotor 40 includes a permanent magnet 42 disposed along a circumferential direction of the rotor 40, and the outer circumferential surface of the permanent magnet 42 is concentric with the inner end surfaces of the pole shoes 36. In particular, the inner end surfaces of the pole shoes 36 are located at a concentric circle with the center of the rotor 40 as the center. Preferably, the permanent magnet 42 is an integral annular permanent magnet. Alternatively, the permanent magnet 42 may comprise a plurality of segmented permanent magnets. It should be understood that the outer surface of the permanent magnets and the inner surfaces of the pole shoes may be not concentric.

In the present embodiment, the rotor 40 further includes a rotor core whose center is traversed by and fixed with the motor shaft 50, and the annular permanent magnet 42 is mounted to the circumferential surface of the rotor core.

Figure 4:
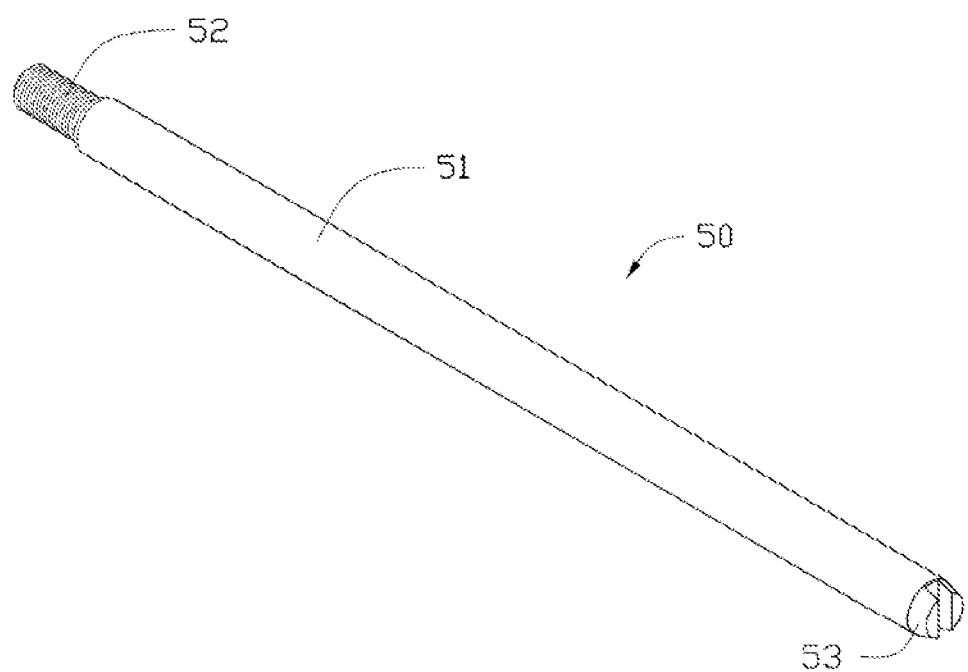
FIG. 4 a perspective view of a motor shaft of the electric motor of FIG. 2.
Figure 5:
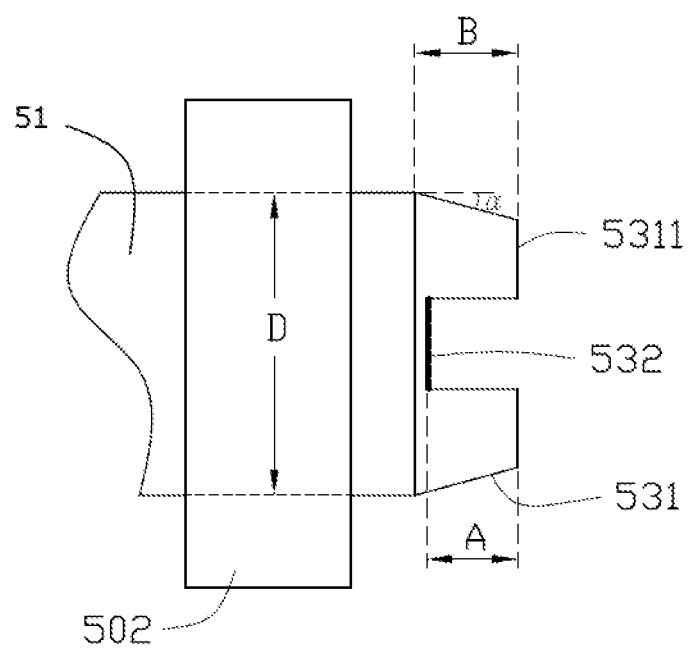
FIG. 5 illustrates the connection between the chamfered end of the motor shaft of FIG. 4 and a bearing.
Figure 6:
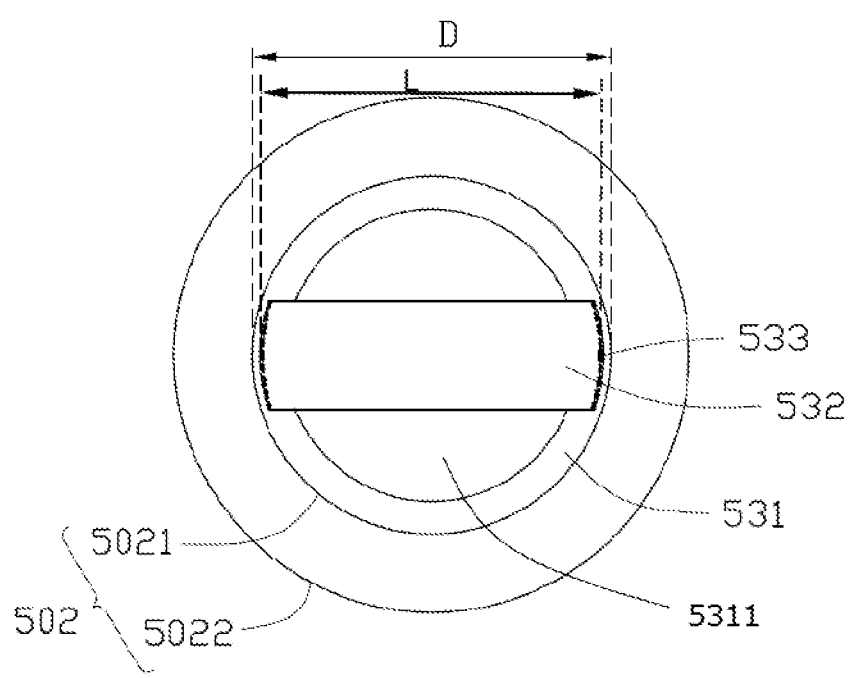
FIG. 6 is an end view of the connection between the chamfered end of the motor shaft and the bearing of FIG. 5, viewed from the distal end of the chamfered end.

FIG. 4 is a perspective view of the motor shaft 50. FIGS. 5-6 illustrate the connection between the motor shaft 50 and a bearing 502. Referring to FIGS. 4-6, the motor shaft 50 has a substantially cylindrical structure and is made of a rigid material for example carbon steel. The motor shaft 50 includes a main body 51, a threaded end 52 and a chamfered end 53. The threaded end 52 and the chamfered end 53 are respectively located at opposite ends of the main body 51. The diameters of the threaded end 52 and the chamfered end 53 are less than the diameter of the main body 51. The chamfered end 53 passes through the bearing 502 to be mounted to the end cap 32 of the stator 30. The threaded end 52 passes through another bearing (not shown) and extends out of the bottom of the cylindrical housing 31. The two bearings support the motor shaft 50 at two ends of the stator 30 so that the rotor 40 can rotate relative to the stator 30. The threaded end 52 can be used, for example, to connect a load for example an impeller.

The outer circumferential surface of the main body 51 is smooth without threads, and the outer circumferential surface of the threaded end 52 is formed with threads. The middle of an end surface 5311 of the chamfered end 53 defines a groove 532 which extends along the radial direction of the end surface 5311. Two ends of the groove 532 extend through opposite sides of the chamfered end 53. In the present embodiment, the groove 532 can be matched with a screwdriver to adjust the installation of the motor 20 and the load. A chamfer 531 is formed on the peripheral side surface of the chamfered end 53. The diameter of the chamfered end 53 gradually decreases from a portion adjacent to the main body 51 to the end surface 5311.

The depth of the groove 532 along the axial direction of the motor shaft 50 is labeled as A, the axial length of the chamfer 531 is labeled as B, the angle of the chamfer 531 is labeled as a which is defined between a slanted side of the chamfer 531 and the axial direction of motor shaft 50. The axial length B of the chamfer 531 is the projected length of the slanted side of the chamfer 531 on the axial direction of the motor shaft 50. In this embodiment, the axial length of the chamfer 531 is greater than the depth of the groove 532, i.e., B>A. The angle α is less than 45 degrees, for example may be 15 degrees, 20 degrees, 25 degrees, 30 degrees, 35 degrees or 40 degrees and so on. The angle α is preferably in the range of 10 to 20 degrees, which causes the chamfer 531 having a certain oblique angle to facilitate assembly of the bearing 502 and the motor shaft 50 and ensures the groove 532 with sufficient width.

In this embodiment, the bearing 502 mounted on the chamfered end 53 of the motor shaft 50 is a ball bearing which includes an outer race 5022, an inner race 5021 and steel balls (not shown). The steel balls are sandwiched between the outer race 5022 and the inner race 5021. The diameter D of the inner race 5021 of the bearing 502 is substantially equal to the diameter of the main body 51 of the motor shaft 50 so that the inner race 5021 of the bearing 502 may be mounted around the main body 51 of the motor shaft 50. Referring to FIGS. 5 and 6, the axial length B of the chamfer 531 is greater than the depth A of the groove 532. A radial length L of the bottom of the groove 532 is less than the diameter D of the inner race 5021 of the bearing 502. Because the diameter of the chamfered end 53 gradually decreases from a portion adjacent to the main body 51 to the end surface 5311, the diameters of the sections of the motor shaft 50 with the groove 532 are less than the diameter D of the inner race 5021 of the bearing 502. Thus, if burrs 533 is formed on the edge of the groove 532 in the process of forming the groove 532, when mounting the bearing 502 to the motor shaft 50, the inner race 5021 of the bearing 502 can effectively avoid the burrs 533 and the sections of the motor shaft 50 with the groove 532, to thereby reduce abrasion of the inner race 5021 of the bearing 502 and noise generated in the mounting process and prolong the usage life of the bearing. Furthermore, the bearing 502 may be mounted to the motor shaft 50 smoothly. It is understandable that other types of bearings may be used in other embodiments.

In the present embodiment, the maximum length of the groove 532 is smaller than the diameter of the main body 51, and the inner diameter of the bearing is substantially equal to the diameter of the main body 51. Thus, when mounting the bearing to the motor shaft, the inner surface of the bearing may avoid the edges of the groove 532 so as not to be scratched.

Therefore, the technical solutions of embodiments of the present invention have been clearly and completely described above. Apparently, the described embodiments are merely part of, rather than all of, the embodiments of the present invention. A person skilled in the art may make various combinations of technical features in the various embodiments to meet practical needs. Based on the described embodiments of the present invention, any other embodiment obtained by a person skilled in the art without paying creative efforts shall also fall within the scope of the present invention.

The invention claimed is:

1. An electric motor, comprising a stator and a rotor, the stator comprising an end cap, the rotor comprising a motor shaft, the motor shaft comprising:
   a main body, and
   a chamfered end formed at an end of the main body, the chamfered end comprising a chamfer formed by a peripheral side surface of the chamfered end and a groove defined on an end surface of the chamfer of the chamfered end,
   wherein an axial length of the chamfer is greater than a depth of the groove in the axial direction of the motor shaft, and the chamfered end of the motor shaft is mounted to the end cap via a bearing, the bearing having an interference fit with the main body of the motor shaft.

2. The electric motor of claim 1, wherein the bearing has an inner race in which the main body of the motor shaft is supported.

3. The electric motor of claim 1, wherein the bearing has an inner race and a diameter of the inner race is greater than a diameter of any cross section of the chamfered end with the groove, the groove dividing the chamfer into two parts in a radial direction.

4. The electric motor of claim 1, wherein the angle of the chamfer is in the range of 10° to 20°.

5. The electric motor of claim 1, wherein the groove extends in a radial direction of the end surface of the motor shaft, and two ends of the groove extend through opposite sides of the chamfered end.

6. The electric motor of claim 1, wherein the maximum length of the groove is less than a diameter of the main body.

* * * * *